June 17, 1958 J. B. DICK 2,838,951
GEAR SHIFT NEUTRALIZER
Filed July 3, 1956 3 Sheets-Sheet 1
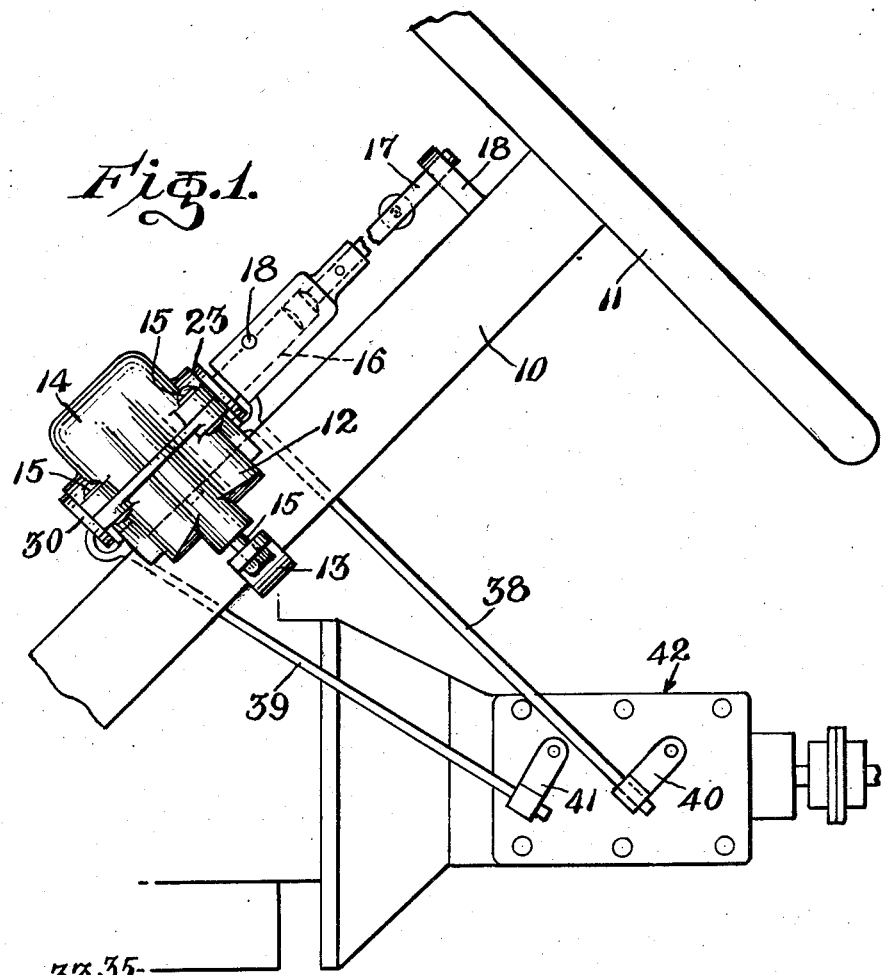
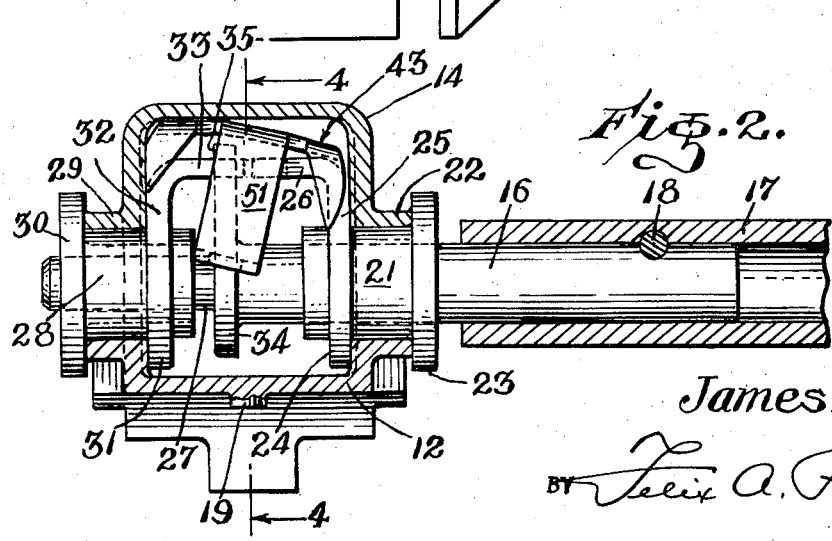
INVENTOR
James B. Dick.
BY Felix A. Russell
ATTORNEY June 17, 1958  J. B. DICK  2,838,951
GEAR SHIFT NEUTRALIZER
Filed July 3, 1956  3 Sheets-Sheet 2
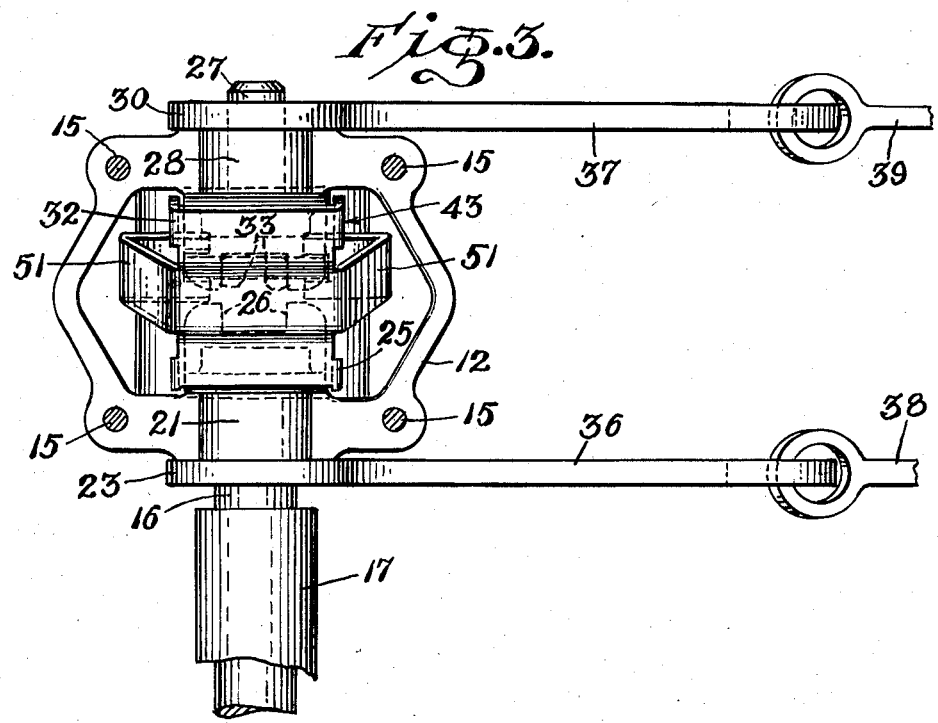
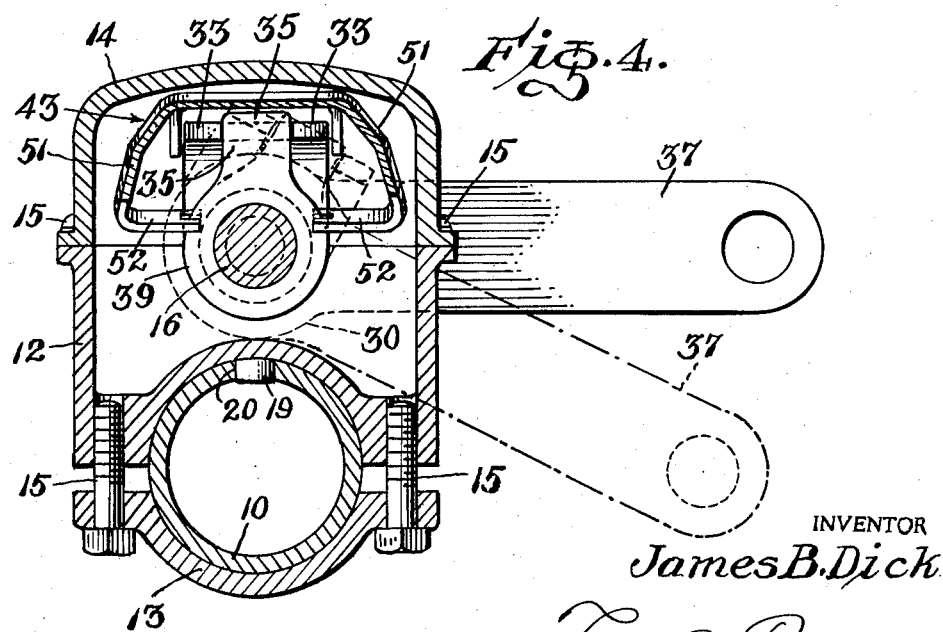
INVENTOR
James B. Dick
BY Felix A. Russell
ATTORNEY June 17, 1958  J. B. DICK  2,838,951
GEAR SHIFT NEUTRALIZER Filed July 3, 1956  3 Sheets—Sheet 3

INVENTOR
James B. Dick
BY *Felix A. Russell*
ATTORNEY

United States Patent Office 2,838,951
Patented June 17, 1958

2,838,951
GEAR SHIFT NEUTRALIZER

James B. Dick, Birmingham, Ala.

Application July 3, 1956, Serial No. 595,786

7 Claims. (Cl. 74—473)

The present invention relates to an improved gear shift neutralizer and it consists in the combinations, constructions and arrangements of parts herein described and claimed.

Generally the present invention constitutes an improvement over my former application entitled Remote Control Gear Shift Neutralizer, Serial No. 368,276, filed July 16, 1953, and my Patent No. 2,716,354, dated August 30, 1955, and entitled Gear Shift Neutralizer. The present invention consists of a single piece of metal bent to proper shape and insertable into a transmission shift box. The device may be mounted within the transmission box by simply removing the cover of the box, placing the present device therein and thereafter replacing the cover. When so positioned, it is out of contact with dirt or other harmful objects and completely enclosed by the transmission box and the lubricant contained therein.

The device essentially consists of a square body of flat metal having downturned pointed corner portions which act as guides when the device is mounted in a transmission box as above set forth. In addition, from a pair of oppositely located central portions of the side of the body there is integrally formed a pair of dependent fork members which engage the shift lug which is conventional in transmission boxes and movement of such shift lug causes one pair or the other pair of the guide members to lock one or the other of the conventional shift levers, thus preventing the meshing of any gears other than those selected and also preventing the locking in of two gears at the same time.

It is accordingly an object of the invention to provide an improved gear shift neutralizer.

Another object of the invention is to provide a device of the character set forth which is simple in construction, inexpensive to manufacture and yet effective and efficient in use.

A further object of the invention is to provide a device of the character set forth which may be formed from a single piece of flat metal.

Another object of the invention is the provision, in a device of the character set forth, of novel combined guide and locking means forming a part of the invention.

Still another object of the invention is to provide, in a device of the character set forth, novel fork members forming a part of the invention.

Other and further objects of the invention will become apparent from a reading of the following specification taken in conjunction with the drawings, in which:

Figure 1 is a side elevational view, of a steering column, transmission shift box and allied mechanisms, Figure 2 is an enlarged fragmentary view, partly in section and partly in elevation, illustrating an embodiment of the invention mounted in a transmission shift box.

Figure 3 is a plan view, with cover removed, of the device as illustrated in Figure 2, Figure 4 is an enlarged sectional view taken along line 4—4 of Figure 2.

Figure 5:
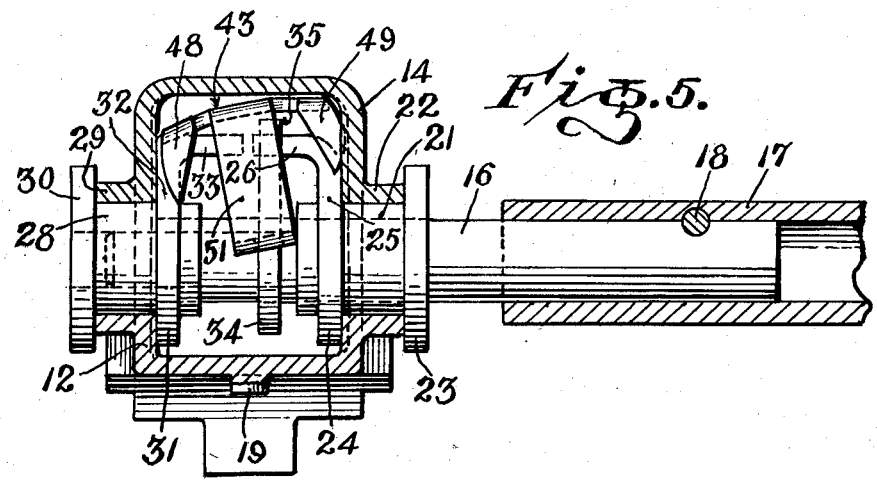
Figure 5 is a view similar to Figure 2 but showing the device of the present invention in another position it may assume during operation.

Referring more particularly to the drawings, there is shown therein a steering column 10 provided at its upper end with a steering wheel 11. A transmission shift box is indicated at 12 and is affixed upon the steering column 10 by means of a clamp 13 or the like. The box 12 is provided with a cover 14, both box 12 and cover 14 being provided with suitable flanges through which screws 15 extend to secure the cover 14 to the box 10.

An operating shaft 16 extends through the box 12 and one end portion thereof extends into the lower end of a shifting column 17 whose upper end is mounted in a suitable bearing 18 affixed to the column 10. The lower end of the shifting column 17 is affixed to the shaft 16 by a pin 18 or the like.

The box 12 is prevented from any relative movement with respect to the column 10 by means of a centrally positioned dog 19 which extends through an opening 20 in the column 10.

A sleeve 21 is rotatably mounted in a journal 22 and has formed integrally therewith a collar 23 which abuts the outer side of the journal 22 and a collar 24 which abuts the inner side of the box 12. The shaft 16 extends rotatably and slidably through the collar 22. The collar 24 is provided with an upstanding arm 25 which is provided at its upper end with a pair of spaced inwardly directed lock arms 26.

A reduced portion 27 of the shaft 16 extends slidably and rotatably through a sleeve 28 rotatably mounted in a journal 29 formed in the other end of the box 12. The sleeve 28 is provided with an integrally formed collar 30 which abuts the outer end of the journal 29 and with an integrally formed collar 31 which abuts the inner face of the box 12 and which is provided with an upwardly extending arm 32 provided at its upper end with a pair of spaced inwardly directed lock arms 33.

At the juncture between the shaft 16 and its reduced portion 27 there is provided an integrally formed collar 34 which carries an integrally formed upwardly extending locking lug 35.

Formed integrally with the collars 23 and 30, respectively, is a pair of radially extending spaced parallel actuator arms 36 and 37, likewise respectively, which are apertured at their outer ends for connection with tie rods 38 and 39, respectively, which interconnect the same with lever arms 40 and 41, respectively, of a conventional transmission generally indicated at 42.

Figure 6:
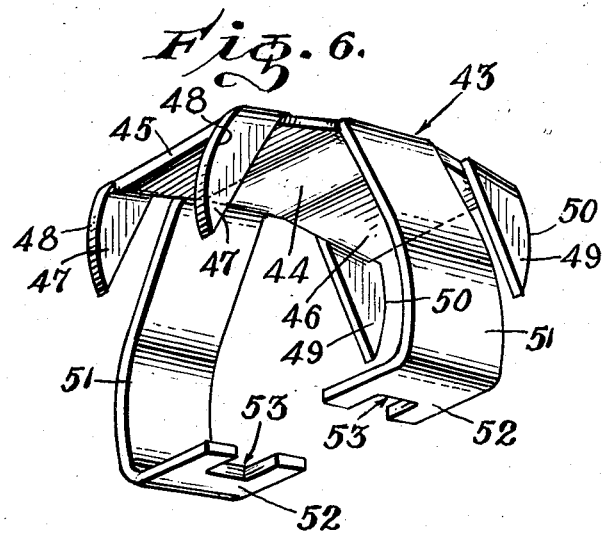
Figure 6 is an enlarged perspective view of the device embodying the present invention.

The device embodying the present invention is shown in detailed perspective in Figure 6 and is generally indicated at 43.

More, in detail, it will be apparent that the adjuster 43 consists of a generally square body 44 whose longitudinal end portions are bent slightly downwardly, as indicated at 45 and 46. A pair of parallel guide and lock members 47 extends downwardly and outwardly from the outermost portion of each side of the end portion 45 and it will be seen that each of the members 47 is provided with an arcuate outer face 48. Identical guide and lock members 49 extend downwardly from the end portion 46 and are likewise provided with arcuate outer faces 50.

Extending centrally and downwardly from each longitudinal side of the base 44 is an outwardly bowed arm 51 the lower end of each of which is provided with an inwardly extending fork 52. The inner ends of the forks 52 are bifurcated, as indicated at 53, and the bifurcations 53 are adapted to engage upon opposite sides of the collar 34 as indicated, for example, in Figure 4 of the drawings.

In operation, it will be apparent that the gear shift neutralizer 43 may be placed in operative position within the box 12 by first removing the cover 14 after which it is only necessary to manipulate the device 43 to a position where the bifurcated members 52 engage opposite sides of the collar 34 and the pairs of guide and lock members 47 and 49 encompass the lock arms 33 and 26, respectively. Thereafter the cover 14 may be replaced and fastened in its original position by means of the screws 15 and the device will now be in fully operative condition.

It is to be understood that when the shaft 16 is moved downwardly, as viewed in Figure 1, that oscillation of the shaft 16 by the conventional shifting lever will place the transmission 42 in either "reverse" or "second" gear. Movement of the shaft 16 upwardly as viewed in Figure 1 or to the right as viewed in Figure 2 will then place the mechanism in condition so that oscillation of the shaft 16 by the conventional shift lever will now cause the transmission 42 to be placed in either "first" or "high" gear.

It will be seen that when the shaft 16 is thus moved axially from right to left as viewed in Figure 2 that the neutralizer 43 will be moved to the position shown in Figure 2 due to the fact that the collar 34 will move the arms 51 to the left through its engagement in the bifurcations 53. Such action will cause the upper portion of the device 53 to move to the right, it being apparent that the arcuate edges 48 will bear against the inner wall of the cover 14 during such movement and that, when the device 43 now comes to rest, the members 50 will lie snugly at either of the outer sides of the lock arms 26 thus maintaining them, and consequently the actuator arm 36 in proper position.

When, however, the shaft 16 is moved to the right as viewed in Figures 2 and 5, the device 43 will come to rest in the position illustrated in Figure 5, again through the action of the collar 34 being engaged in the bifurcations 53 and the guiding action of the arcuate faces 50 bearing against the inner wall of the cover 14. In its new position, it will be apparent that the members 47 will closely engage the outer faces of the lock arms 33 thus maintaining the actuator arm 37 in its proper position. In either of the two positions, where one pair of lock arms 26 or 33 is engaged by its associated pair of guide and lock members 47 or 49, as the case may be, it will be apparent that the other pair of lock arms is free to oscillate. Thus it will be further seen that only the gear ratio selected by the operator may be placed in action when the device 43 is in its operative position as aforesaid. It will also be seen that the device 43 maintains proper alignment at all times between the pairs of lock arms 26 and 33 so that the operator may quickly and easily move from the two upper positions to the two lower positions even though the parts within the box 12 may have become worn through use.

While but one form of the invention has been shown and described herein, it will be readily apparent to those skilled in the art that many minor modifications may be made without departing from the spirit of the invention or the scope of the appended claims.

What is claimed is:

1. A device of the character described comprising a rectangular body, a downwardly and outwardly extending guide and lock member formed integrally with the outermost portion of each longitudinal side of said body, a dependent arm formed integrally with the central portion of each longitudinal side of said body, and an inwardly directed fork formed integrally with the lower end of each arm.

2. A device as defined in claim 1 wherein said body is provided with slightly downwardly directed longitudinal end portions.

3. A device as defined in claim 1 wherein said arms are outwardly bowed.

4. A device as defined in claim 1 wherein said guide and lock members are each provided with outwardly extending arcuate outer faces.

5. A device of the character described comprising a rectangular body, slightly downwardly directed longitudinal end portions, a downwardly and outwardly extending guide and lock member formed integrally with the outermost portion of each longitudinal side of said body, said guide and lock members at either end of said body lying in planes parallel to each other, said guide and lock members at either side of said body lying in the same plane, an outwardly bowed arm formed integrally with the central portion of each longitudinal side of said body, and an inwardly directed fork formed integrally with the lower end of each arm, said guide and lock members each being provided with an outwardly extending arcuate outer face.

6. In combination with a transmission box having a removable cover, an operating shaft extending rotatably and slidably through said box, a collar affixed to said shaft within said box, two pairs of opposed lock arms in said box and selectively operable by said shaft, an actuator arm extending from either side of said box and each operable by movement of one of said pairs of lock arms, the provision of means mountable within said box selectively locking one pair of lock arms while releasing the other pair for movement, said means comprising a rectangular body, a downwardly and outwardly extending guide and lock member formed integrally with the outermost portion of each longitudinal side of said body, a dependent arm formed integrally with the central portion of each longitudinal side of said body, and an inwardly directed fork formed integrally with the lower end of each arm.

7. In combination with a transmission box having a removable cover, an operating shaft extending rotatably and slidably through said box, a collar affixed to said shaft within said box, two pairs of opposed lock arms in said box and selectively operable by said shaft, an actuator arm extending from either side of said box and each operable by movement of one of said pairs of lock arms, the provision of means mountable within said box selectively locking one pair of lock arms while releasing the other pair for movement, said means comprising a rectangular body, slightly downwardly directed longitudinal end portions, a downwardly and outwardly extending guide and lock member formed integrally with the outermost portion of each longitudinal side of said body, said guide and lock members at either end of said body lying in planes parallel to each other, said guide and lock members at either side of said body lying in the same plane, an outwardly bowed arm formed integrally with the central portion of each longitudinal side of said body, and an inwardly directed fork formed integrally with the lower end of each arm, said guide and lock members each being provided with an outwardly extending arcuate outer face.

References Cited in the file of this patent

UNITED STATES PATENTS

| | | |
|---|---|---|
| 2,180,579 | Butzbach | Nov. 21, 1939 |
| 2,231,742 | Witzke | Feb. 11, 1941 |